United States Patent [19]

Koleske

[11] 4,297,476

[45] Oct. 27, 1981

[54] ESTER DIOL ALKOXYLATE BASED ALKYD RESINS

[75] Inventor: Joseph V. Koleske, Charleston, W. Va.

[73] Assignee: Union Carbide Corporation, New York, N.Y.

[21] Appl. No.: 153,457

[22] Filed: May 27, 1980

[51] Int. Cl.[3] .............................................. C08G 63/66

[52] U.S. Cl. .................................... 528/300; 525/437; 525/441; 528/302; 528/303; 528/304; 260/22 R; 260/22 CQ

[58] Field of Search ........................ 260/22 R, 22 CQ; 528/300, 302, 303, 304; 525/437, 441

[56] References Cited

U.S. PATENT DOCUMENTS

| | | | |
|---|---|---|---|
| 3,449,467 | 6/1969 | Wynstra | 528/272 |
| 3,645,984 | 2/1972 | Dowbenko et al. | 204/159.22 |
| 3,959,201 | 5/1976 | Chang | 260/29.4 R |
| 4,163,114 | 7/1979 | Koleske et al. | 560/186 |
| 4,171,423 | 10/1979 | Smith et al. | 528/289 |

OTHER PUBLICATIONS

Beth, American Paint & Coating Journal, pp. 54–74, Sep. 8, 1975.

Brushwell, American Paint & Coating Journal, pp. 53–57, May 1, 1978.

*Primary Examiner*—Lucille M. Phynes

*Attorney, Agent, or Firm*—Francis M. Fazio

[57] ABSTRACT

Alkyd resins produced by the reaction of ester diol alkoxylate, polyol and polycarboxylic acid. The alkyd resins are useful in coating compositions as well as those other applications in which known alkyd resins are employed.

21 Claims, No Drawings

ESTER DIOL ALKOXYLATE BASED ALKYD RESINS

BACKGROUND OF THE INVENTION

During the initial development of alkyd resins the reaction mixtures contained fatty oils or fatty acids. As the technology advanced these reactants were omitted and a new breed of alkyds, which came to be known as oil-free alkyds, has developed. Both are now available commercially and determination of which type is to be used often depends on cost as well as properties desired. Due to their commercial importance they are well known to those skilled in the art and voluminous literature exists. Also, because of their importance, continuous efforts are made to discover and develop new alkyd resins. This invention is directed to a new class of alkyd resins using the newly discovered ester diol alkoxylates of U.S. Pat. No. 4,163,114, issued on July 31, 1979 to Koleske et al, as a reactant in their production.

SUMMARY OF THE INVENTION

The novel alkyd resins of this invention are the reaction products of an ester diol alkoxylate, a polyol and a polycarboxylic acid or anhydride thereof. They are produced in accord with the processes normally used and commercially practiced for the production of alkyds as will be described hereinafter.

Coating compositions can be readily produced from the novel alkyd resins. Of particular interest are those formulations containing crosslinkers, such as the melamineformaldehyde resins.

DESCRIPTION OF THE INVENTION

The ester diol alkoxylates used for the production of the alkyd resins of this invention are known compounds that are disclosed in the aforementioned U.S. Pat. No. 4,163,114; they are defined by the structural formula:

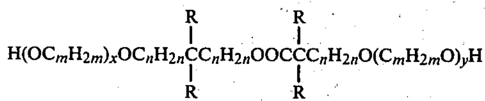

II wherein m is an integer having a value of from 2 to 4, preferably 2 or 3; n is an integer having a value of from 1 to 5, preferably 1 to 3 and x and y are integers each having a value of from 1 to 20, most preferably from 1 to 10; and R is an unsubstituted or substituted, linear or branched alkyl group having from 1 to 8 carbon atoms, preferably 1 to 3 carbon atoms. The substituents on the R group can be any inert group that will not interfere with the reaction involved in the production of the alkyd resin and can be for example, cyano, halogen, alkoxyl, nitro, tertiary amine, sulfo, etc. In the formulas the variables R, m, n, x and y can be the same or different at the various locations.

The ester diol alkoxylates (II) are produced by the catalytic reaction of an ester diol (I) corresponding to the structural formula:

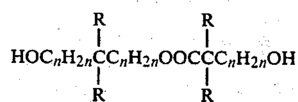

I with an alkylene oxide or mixtures of alkylene oxides at an elevated temperature as more fully discussed below. One can thus manufacture the mono, mixed, blocked or capped adducts. Such compounds (I) are disclosed for example in U.S. Pat. No. 3,645,984 issued Feb. 29, 1972 to Dowbenko et al and in U.S. Pat. No. 3,959,201 issued May 25, 1976 to Chang.

The alkylene oxides suitable for use in the production of the ester diol alkoxylates (II) are the oxirane compounds such as styrene oxide, ethylene oxide, 1,2-propylene oxide, 1,3-propylene oxide, 1,2-butylene oxide, 1,3-butylene oxide and 1,4-butylene oxide as well as similar higher aliphatic monoepoxides.

The ester diols of formula (I) include 2,2-dimethyl-3-hydroxy-propyl 2,2-dimethyl-3-hydroxypropionate; 2,2-dimethyl-4-hydroxy-butyl 2,2-dimethyl-3-hydroxypropionate; 2,2-dimethyl-4-hydroxybutyl 2,2-dimethyl-4-hydroxybutyrate; 2,2-dipropyl-3-hydroxypropyl 2,2-dipropyl-3-hydroxypropionate; 2-ethyl-2-butyl-3-hydroxypropyl 2-ethyl-2-butyl-3-hydroxypropionate; 2-ethyl-2-methyl-3-hydroxypropyl 2-ethyl-2-methyl-3-hydroxypropionate; and the like.

During the reaction of the ester diol (I) with the alkylene oxide a catalyst is preferably used in a catalytically effective amount. The amount of catalyst is from 0.01 to 5 weight percent, preferably from 0.05 to 0.5 weight percent, based on the combined weights of ester diol (I) and oxirane compound. The catalysts useful are known to those skilled in the art of alkylene oxide addition chemistry, require little further discussion here and include boron trifluoride etherate, potassium, potassium hydroxide, sodium, sodium hydroxide, the Lewis acids, sodium ethoxide, mineral acids, and the like.

The reaction of the ester diol (I) with the oxirane or alkylene oxide is carried out at a temperature of from 20° to 150° C., preferably from 50° to 120° C. for a period of time sufficient to complete the reaction between the reactants charged. The temperature is often dependent upon the particular catalyst selected and the alkylene oxide employed. The time will vary depending upon the size of the batch and the particular reactants and catalysts, and the reaction conditions employed.

The reaction can be conducted at subatmospheric, atmospheric or superatmospheric pressure. The pressure is not critical and sufficient pressure is generally used to retain the reactants in the reactor in liquid form.

The amount of oxirane compound or alkylene oxide charged to the reaction is from about 2 moles to about 40 moles, or more, per mole of ester diol (I) charged; preferably from 2 to 20 moles.

To minimize oxidative side reactions the reaction is preferably carried out under an inert gas atmosphere using nitrogen, argon or other inert gas.

If desired an inert solvent such as toluene, benzene or 1,1,1-trichloroethane can be employed. However, the reaction proceeds well in the absence of any such solvent. In most instances a solvent is not required as the ester diol (I) in most instances is itself a liquid at the elevated temperatures employed and serves to maintain a liquid reaction system. At the conclusion of the reaction the product, consisting of a mixture of the ester diol alkoxylates (II), is recovered as a residue product and can be used as such; distillation procedures can also be used to recover more refined products.

The polyols used in the production of the alkyd resins contain from 2 to 6 hydroxyl groups, and as is known in the art a mixture of the polyhydroxyl compounds can be used. Illustrative of suitable polyols one can mention ethylene glycol, propylene glycol, butylene glycol, diethylene glycol, triethylene glycol, the polyethylene glycols, dipropylene glycol, the polypropylene glycols, hexylene glycol, bisphenol-A, 2-ethyl-1,3-hexane diol, 3-ethyl-1,5-pentanediol, 1,5-pentanediol, 1,4-cyclohexane diol, 1,3-bis(hydroxyethyl) benzene, 1,4-cyclohexanedimethanol, 1,4-xylylene glycol, glycerol, 1,2,6-hexanetriol, trimethylolpropane, erythritol, pentaerythritol, sorbitol, mannitol, glucose, mannose, inositol, 2,3-butanediol, 1,6-hexanediol, 1,7-heptanediol, 1,8-octanediol, 1,9-nonanediol, 1,10-decanediol, 1,12-dodecanediol, neopentyl glycol, adonitol, dulcitol, 1,4-cyclohexane dimethanol, 1,1,1-triohydroxymethylene, 2-methyl-2-hydroxy-5-methyl-5-hydroxy hexane, 2-butyne-1,4-diol $HOCH_2C{\equiv}CCH_2OH$, 2-butene-1,4-diol, 2-chloro-1,3-propanediol, 2,3-dimethyl-2,3-butanediol, 1,2,4-butanetriol, etc.

The polycarboxylic acids useful include phthalic acid, isophthalic acid, terephthalic acid, maleic acid, fumaric acid, succinic acid, adipic acid, azelaic acid, sebacic acid, as well as the anhydrides thereof, including 3,3′,4,4′-benzophenone tetracarboxylic dianhydride, trimellitic anhydride, tetrahydrophthalic anhydride, benzophenone dicarboxylic acid, naphthoic anhydride, glutaric anhydride, nadic anhydride, oxalic acid, maloric acid, pimelic acid, subaric acid, brassylic acid, citric acid, tartaric acid, hexachloroendomethylene tetrahydrophthalic acid, tetrachlorophthalic acid, etc. The suitable acids contain from 2 to 3 carboxyl equivalents in the molecule; they are well known to those skilled in the art and the above listing is not all-inclusive; further it is known that mixtures can be used and that monobasic acids are sometimes used in small quantities to lower the functionality of the reactants.

In producing the alkyd resins, a mixture of the ester diol alkoxylate, polyol and carboxylic acids is heated at an elevated temperature. One can also have present in the reaction an inert organic solvent. The reaction is carried out at from about 200° C. to about 250° C.; the temperature should be sufficiently high to maintain the reaction in a molten state and to distill the water produced during the condensation reaction.

The time will vary depending upon the particular reactants charged, the temperature employed, and the size of the batch and the acid number desired in the final product. Upon completion of the reaction, solvent can be removed by conventional means or the solvent can be retained and further diluted with additional solvents should a solution be desired.

In producing the alkyd resins when the reactants are charged in amounts to permit the reaction of essentially all of the carboxylic acid goups with an excess of hydroxyl groups, one obtains an end-product containing free hydroxyl groups. However, it is known that in esterification reactions it is difficult to obtain complete reaction; as a result the products generally contain a minor amount of unreacted carboxyl equivalents, as evidenced by a low acid number. When the amounts of hydroxyl groups charged are insufficient to react with all of the carboxylic groups, one obtains an end-product containing free hydroxyl groups and more unreacted free carboxyl groups.

The concentration of ester diol alkoxylate charged to the reaction can be from 30 to 80 mole percent of the total weight of hydroxyl compounds charged, preferably from 50 to 60 mole percent.

The oil-free alkyds can be formulated to coating compositions having excellent impact resistance, adhesion and water resistance. In these coating compositions the alkyd resins of this invention can be present at concentrations of from 20 to 90 weight percent, preferably 40 to 85 weight percent, based on the weight of alkyd, crosslinker and, if present, other hydroxyl compounds present in the composition. Colorants, catalysts, flow control agents and other additives normally used in coatings and inks can also be present. The alkyds can also be used in the multitude of applications in which alkyd resins are currently being employed.

Ester Diol Propoxylate A

A reactor was charged with 805 grams of freshly stripped solid 2,2-dimethyl-3-hydroxypropyl 2,2-dimethyl-3-hydroxypropionate and 8 grams of boron trifluoride etherate as catalyst and heated to liquify the solid. The reactor was purged with nitrogen and then over a 1.75 hours addition period 811 grams of propylene oxide were added while maintaining a temperature of from 57° to 60° C. After all of the propylene oxide had been added, the reaction mixture was stirred at about 60° C. for another 2 hours. The reaction product was neutralized with 32.3 grams of magnesium silicate, stirred at about 70° C. for about 1.5 hours, stripped at 70° C. for 0.5 hour at 4–5 mm. of mercury and filtered. The liquid ester diol propoxylate residue product was clear and colorless and weighed 1,508 grams. It had an average of about 4 propyleneoxy units in the molecule.

Ester Diol Ethoxylate B

A glass-lined autoclave was charged with 429.47 parts of 2,2-dimethyl-3-hydroxypropyl 2,2-dimethyl-3-hydroxypropionate and 2.4 parts of boron trifluoride etherate. The mixture was heated to 55° C. and 370.5 parts of ethylene oxide were added over a period of about 13 hours. This mixture was then held at this temperature for four more hours. Then, 2 percent by weight of magnesium silicate was added and the contents were heated to 90° C. and stirred for 4 hours. Thereafter the pressure was reduced to 20 mm Hg and the product was stripped for four hours to remove volatiles. Atmospheric pressure was restored with nitrogen, the contents were cooled to 50° C., and transferred to a storage autoclave. Five parts of filter aid were added, the contents were mixed for 30 minutes, and then filtered and stored. A second batch was made in the same manner and both batches were blended by placing the materials in a large autoclave, heating the contents to 90° C., and stripping the product 4 hours at 5 mm Hg. There was obtained a large quantity of the liquid ester diol ethoxylate having an average of about 4 ethyleneoxy units in the molecule.

The production of the above ester diol alkoxylates is presented for illustrative purposes only. In U.S. Pat. No. 4,163,114 there is described the production of many others, all of which can be used in the production of the alkyd resins and coating compositions of this invention. To avoid redundancy, reference is made to the disclosure and examples of U.S. Pat. No. 4,163,114.

The following examples serve to further illustrate the invention.

EXAMPLE 1

The following ingredients were charged to a 500 ml. resin kettle equipped with a stirring rod, a thermometer, a nitrogen inlet tube, and condenser, and Dean-Stark trap.

Ester Diol Ethoxylate B: 171 gm
Trimethylopropane: 44.67 gm

Isophthalic Acid: 110.67 gm

Ethyl Benzene: 70 gm

These ingredients were heated to 240° C. to melt the isophthalic acid and held at 220° C. for 20 hours to effect the condensation reaction. During the condensation reaction nitrogen was sparged through the reactor and water formed was distilled off. The acid number of the product produced was measured to be 10.56 indicating that most of the carboxylic acid groups had condensed with hydroxyl groups. The reaction mixture was cooled to 150° C. and 35 gm of 2-ethoxyethyl acetate were added. Then, the system was cooled to 120° C. and 70 grams of butyl acetate were added. The solvents were added to reduce the viscosity of the oil-free alkyd for use as a high solids coating. The oil-free alkyd solution was 62 percent solids, light amber in color, and had a Brookfield viscosity of 115 cps and a No. 4 Ford Cup viscosity of 25.4 sec. when measured at room temperature. The technique of vapor phase osmometry was used to measure the number average molecular weight of the oil-free alkyd. With this technique, $M_n=1{,}037$.

EXAMPLE 2

The following ingredients were reacted as described in Example 1.

Ester Diol Ethoxylate B: 171 gm

Trimethylolpropane: 44.67 gm

Isophthalic Acid: 110.67 gm

Ethyl Benzene: 70 gm

In this example ethyl benzene was used as the immiscible agent to trap water and facilitate its removal from the reaction system. The trap was filled with 40 gm of the ethyl benzene and 30 gm were added to the reaction vessel. The contents were heated to 240° C. to melt the isophthalic acid and then held at 210°-215° C. for 16 hours under mild reflux conditions. The acid number was determined each hour; when it had decreased to 8.10, 16 hours, the reaction was considered to be complete. At this point the alkyd resin produced was cooled to 110° C. and 70 grams of butyl acetate added. At room temperature, the 68% total solids product had a Brookfield viscosity of 365 cps and a No. 4 Ford Cup viscosity of 91.5 seconds. Vapor pressure osmometry indicated that the oil-free alkyd had a number average molecular weight of 1,630.

EXAMPLE 3

Example 2 was repeated except that there was no ethyl benzene in the reaction kettle at the start of the experiment. It was only placed in the trap where it would be available to collect the water formed during the run. After water was not being removed, ethyl benzene was added to facilitate removal of water formed in the reaction mixture. After 12.5 hours, the acid number was 10.5 and then the ethyl benzene was stripped from the reaction mixture. The residual oil-free alkyd-resin produced was cooled to 150° C. and 70 grams of ethoxyethyl acetate were added. This run indicates that initially having the immiscible solvent only in the trap could result in a shorter reaction time.

The following procedure was used in the production of the oil-free alkyds of Examples 4 to 16 using equipment as described in Example 1. The reactor was charged with the ester diol alkoxylate, carboxylic acid compound and trimethylolpropane. In Examples 4 to 6, ethylbenzene was added to the reactor and in Examples 7 to 16 the trap was prefilled with about 65 ml of ethylbenzene. The reactants were heated to 230° to 240° C. with good agitation until all components were in a liquid state, using a slight flow of nitrogen into the reactor. When all ingredients were liquid, the temperature was reduced to 210° to 220° C. and maintained there for the duration of the reaction. As water from the condensation reaction began to accumulate in the trap, ethylbene was displaced into the reactor, with reflux resulting; condensed water was removed from the trap as necessary. Acid number was determined at the start of the reaction and at two hour intervals; the reaction was considered complete when the acid number was ten or lower. At completion of ethylbenzene was stripped from the mixture, the alkyd resin was cooled to about 150° C. and ethoxyethyl acetate was added. After cooling to 100° C. the solution was poured into storage containers. Table I illustrates the use of unsaturated cyclic polycarboxylic compounds, Table II the use of saturated aliphatic polycarboxylic compounds, and Table III the use of unsaturated aliphatic polycarboxylic compounds; or the anhydrides thereof.

TABLE I

| Example | 4 | 5 | 6* | 7 |
|---|---|---|---|---|
| Component, grams | | | | |
| Ester diol ethoxylate B | 171 | — | — | 171.0 |
| Ester diol propoxylate A | — | 171 | 82.5 | — |
| phthalic anhydride | 110.67 | — | — | — |
| isophthalic acid | — | 110.67 | 55.34 | — |
| tetrahydrophthalic anhydride | — | — | — | 101.43 |
| trimethylolpropane | 44.67 | 44.67 | 23.34 | 44.67 |
| Solvents | | | | |
| ethyl benzene | 20 | 10 | 15 | — |
| ethoxyethylacetate | 70 | 70 | 35 | 0 |
| Reaction Conditions and Results | | | | |
| Time, hours | 21 | 15.5 | 8.5 | 20 |
| Acid Number | 17.0 | 8.21 | 8.91 | 9.24 |
| Number Average Molecular Weight | 1294 | 1886 | — | — |
| Total Solids, % | 75 | 76 | 76 | 100 |
| Room Temperature Viscosity, cps | 2295 | 10,240 | 6900 | 136,000 |

In Example 6 an attempt was made to accelerate the reaction by the addition of 0.08 g of dibutyltin dilaurate after the condensation had been in progress for about 3 hours. Little effect was observed after an additional 3 hours, the acid number was 29.33; at this point another 0.08 g of dibutyltin dilaurate was added and heating was continued another 2.5 hours until the acid number reached 8.91. Since the total reaction time was 8.5 hours, it was concluded that addition of the catalyst apparently does result in a shorter reaction time.

TABLE II

| Example | 8 | 9 | 10 | 11 | 12 | 13 |
|---|---|---|---|---|---|---|
| Component, grams | | | | | | |
| Ester diol ethoxylate B | 171 | 171 | 171 | 85.5 | 85.5 | 85.5 |
| succinic anhydride | 74.72 | — | — | — | — | — |
| adipic acid | — | 97.34 | — | — | — | — |
| dodecenylsuccinic anhydride | — | — | 177.59 | — | — | — |
| sebacic acid | — | — | — | 67.42 | — | — |
| d,1-malic acid | — | — | — | — | 44.7 | — |
| nadic anhydride | — | — | — | — | — | 54.72 |
| trimethylolpropane | 44.67 | 44.67 | 44.67 | 22.34 | 22.34 | 22.34 |
| Solvents | | | | | | |
| ethyl benzene | — | — | — | — | — | — |

TABLE II-continued

| Example | 8 | 9 | 10 | 11 | 12 | 13 |
|---|---|---|---|---|---|---|
| ethoxyethyl-acetate | 0 | 0 | 0 | 0 | 0 | 0 |
| Reaction Conditions and Results | | | | | | |
| Time, hours | 11 | 10 | 13.5 | 9.5 | 7.5 | 16 |
| Acid Number | 8.73 | 8.86 | 8.54 | — | 7.0 | 9.76 |
| Number Average Molecular Weight | — | — | — | Gel | — | — |
| Total Solids, % | 100 | 100 | 100 | 100 | 100 | 100 |
| Room Temperature Viscosity, cps | * | 15,160 | 68,400 | Gel | 150,000 | 200,000 |

*Product was a very light amber liquid, too viscous to permit measurement.

TABLE III

| Example | 14 | 15 | 16 |
|---|---|---|---|
| Component, grams | | | |
| Ester diol ethoxylate B | 171 | — | 171 |
| Ester diol propoxylate A | — | 156 | — |
| maleic acid | 77.34 | 70.36 | — |
| maleic anhydride | — | — | 65.34 |
| trimethylolpropane | 44.67 | 40.65 | 44.67 |
| Reaction Time and Results | | | |
| Time, hours | [illegible] | 9 | 7.5 |
| Acid Number | 8.93 | 9.78 | 9.82 |
| Room Temperature Viscosity, cps | 51,200 | 200,000 | 18,000 |
| Total Solids, % | 100 | 100 | 100 |

Oil-free alkyds of the type produced in Table III, containing residual unsaturation, are useful as coatings intermediates or for making molded parts by the addition of polymerizable monomers, e.g. styrene, and catalyst and curing by known procedures.

The oil-free alkyds produced in the above examples were used to produce coating compositions and cured. The coating compositions can contain organic solvents known in the art in their conventional concentrations, generally up to about 60 weight percent or more, as well as other additives including crosslinkers and catalysts. Illustrative of suitable crosslinkers are the urea, benzoguanamine and melamine resins; these are generally present at concentrations of from 10 to 70 weight percent, preferably from 10 to 60 weight percent based on the solids in the formulation. Of particular interest are the methylolated melamines containing two or more methoxymethyl groups in the molecule, with hexamethoxymethylmelamine most preferred. Catalysts are often included to improve the cure efficiency and the concentration used will vary from zero to about 10 weight percent, based on the total weight of the coating composition. The particular catalyst used and its concentration are dependent to a degree upon its catalytic activity and the specific components present in the coatings composition. These catalysts are known to those skilled in the art and include hydrochloric acid, sulfuric acid, p-toluene sulfonic acid, dodecylbenzene sulfonic acid, phosphoric acid, and its alkyl derivatives, maleic acid, trimellitic acid, phthalic acid, succinic acid, trifluorosulfonic acid and its tin salts, and the like.

The coating compositions can also contain pigments, fillers, and other additives conventionally present in coatings compositions in their conventional quantities. The particular ones selected are of no consequence to the invention. In preparing the coating compositions, the ingredients are mixed by the conventional procedures used in the production of paints, inks or coatings compositions. These procedures are so well known to those skilled in the art that they do not require further discussion here.

The coating compositions are applied to a surface or substrate by conventional means and then thermally cured by heating at a temperature of about 125° to 250° C., preferably from 150° to 200° C. for a period of time sufficient to obtain a dry film. Generally, this time will range from about one to 30 minutes, preferably from 10 to 20 minutes. The components present in a particular coating composition will determine the temperature and time that will be required to obtain an adequate cure and a good film coating.

The coating compositions of this invention can contain as much as 90 weight percent or more solids therein. Generally the total solids content of the coating compositions range up to about 90 weight percent of the total weight of the coating composition.

The coating compositions were evaluated according to the following procedures. Crosshatch adhesion refers to a test using 10 parallel single edge razor blades to scribe test films with 2 sets of perpendicular lines in a crosshatch pattern. Ratings are based on the amount of film removed after applying and subsequently pulling a contact adhesive tape (Scotch Brand 606) away from the surface of the scribed coating at a 90 degree angle in a fast rapid movement. It is important to carefully apply and press the tape to the scribed coating to eliminate air bubbles and provide a good bond because adhesion is reported in percent of film remaining on the substrate with a 100 percent rating indicating complete adhesion of the film to the substrate. Wet adhesion is the same test performed on the coating after immersion in a 55° C. water bath for 16 hours.

Solvent resistance or acetone rubs is a measure of the resistance of the cured film to attack by acetone and is reported in the number of rubs or cycles of an acetone soaked cheesecloth required to remove one half of a film from the test area. The test is performed by stroking the film with an acetone soaked cheesecloth until that amount of film coating is removed. The number of cycles required to remove this amount of coating is a measure of the coating solvent resistance.

Reverse impact and face impact measure the ability of a given film to resist rupture from a falling weight. A Gardner Impact Tester using an eight pound dart is used to test the films cast and cured on the steel panel. The dart is raised to a given height in inches and dropped on to the reverse or the face side of a coated metal panel. The inches times pounds, designated inch-pound, absorbed by the film without rupturing is recorded as the films reverse or face impact resistance.

Gloss was determined in accord with the procedures described in ASTM D-523.

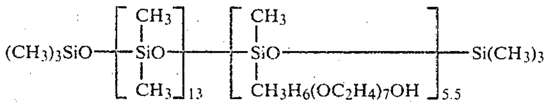

Cymel 301 R is hexamethoxymethylmelamine having a free hydroxyl content of about 3.5% and an average molecular weight of 450.

Cymel 303 R is hexamethoxymethylmelamine having a free hydroxyl content of about 1.5% and an average molecular weight of 600.

EXAMPLE 17

Two series of coating compositions were produced with the oil-free alkyd prepared in Example 2 by blending the components set forth in Tables IV and V. The coatings were applied on steel panels using a No. 60 wire-wound rod, kept at ambient temperature for about 30 minutes and then cured in an oven for 30 minutes at 177° C. (Table IV) or 30 minutes at 121° C. (Table V).

The results indicated that the coatings were tough and hard, and had good adhesion and water resistance. Runs A and C to K rated 100 acetone rubs, Run B 80 rubs. Reverse and face impact values measured were all greater than 320 in-lb. Crosshatch and wet adhesion values measured were all 100% except for the wet adhesion of Run E which was 50%; wet adhesion was not determined in Runs H to K.

TABLE IV

| Run | A | B | C | D | E | F | G |
|---|---|---|---|---|---|---|---|
| Ex. 2 Alkyd, gms. | 9.81 | 9.81 | 9.81 | 9.81 | 9.81 | 9.81 | 9.81 |
| Cymel 301, gms. | 1.67 | — | — | — | — | — | — |
| Cymel 303, gms. | — | 1.67 | 2.0 | 1.67 | 2.0 | 2.0 | 2.0 |
| Isophorone, gm. | 1.0 | 1.0 | 1.0 | 1.0 | — | — | — |
| Ethoxyethyl acetate, gm. | — | — | — | — | 1.0 | 1.0 | 1.0 |
| 10% paratoluene sulfonic acid in isopropanol, gm. | — | — | — | — | — | — | 0.01 |
| 20% paratoluene sulfonic acid in isopropanol, gm. | 0.02 | 0.02 | 0.02 | — | 0.01 | — | — |
| Pencil Hardness | — | H | 2H | F | 2H | H | 2H |

TABLE V

| Run | H | I | J | K |
|---|---|---|---|---|
| Ex. 2 Alkyd, gms | 9.81 | 9.81 | 9.81 | 9.81 |
| Cymel 303, gms. | 2 | 2 | 2 | 2 |
| Ethoxyethyl acetate, gm. | 1.0 | 1.0 | 1.0 | 1.0 |
| 20% paratoluene sulfonic acid in isopropanol, gm. | 0.02 | — | — | — |
| 40% paratoluene sulfonic acid in isopropanol, gm. | — | 0.01 | 0.02 | 0.03 |
| Pencil Hardness | — | F | H | 2H |

EXAMPLE 18

The alkyds described in Examples 4 to 6 were used to prepare coatings and the properties of the coatings were determined; Table VI. The ingredients listed below were weighed into a container, mixed well, cast onto steel panels with a number 40 wire wound rod, and cured in a forced-air oven as indicated, following the procedures outlined in Example 17.

TABLE VI

| Run | A | B | C | D | E | E |
|---|---|---|---|---|---|---|
| Ingredients | | | | | | |
| Ex. 4 Alkyd, gms. | 10 | 10 | 10 | 10 | — | — |
| Ex. 5 Alkyd, gms. | — | — | — | — | 10 | — |
| Ex. 6 Alkyd, gms | — | — | — | — | — | 10 |
| Cymel 303, gms. | 2 | 2 | 2 | 2 | 2 | 2 |
| Ethoxyethyl acetate, gms. | 1.0 | 1.0 | 1.0 | 1.0 | 2.0 | 2.0 |
| 40% solution of paratoluene sulfonic acid in isopropanol, gm. | 0.01 | 0.02 | 0.02 | 0.04 | 0.02 | 0.02 |
| Cured at 350° C., 20 min. | | | | | | |
| Acetone Rubs | 100 | — | 100 | — | — | — |
| Reverse Impact, in. lbs. | >320 | — | >320 | — | — | — |
| Face Impact, in. lbs. | >320 | — | >320 | — | — | — |
| Pencil Hardness | H | — | H | — | — | — |
| Crosshatch Adhesion, % | 100 | — | 100 | — | — | — |
| Cured at 250° C., 20 min. | | | | | | |
| Acetone Rubs | — | 100 | — | 100 | 100 | 100 |
| Reverse Impact, in.-lbs. | — | >320 | — | >320 | >320 | >320 |
| Face Impact, in.-lbs. | — | >320 | — | >320 | >320 | >320 |
| Pencil Hardness | — | H | — | 2H | H | 2H |
| Crosshatch Adhesion, % | — | 100 | — | 100 | 100 | 100 |

The results demonstrate that coatings based on these alkyds have good coating characteristics.

EXAMPLE 19

A series of pigmented coatings was prepared, Table VII. A pigment grind was prepared from the alkyd, titanium dioxide, and ethoxyethyl acetate by weighing the grind ingredients into a ball mill, adding the grind pebbles, sealing the system, and allowing it to grind overnight. This grind was then let-down by adding the associated solvent, catalyst, and melamine crosslinking agent. The ball mill was again sealed and the system was blended on a roll mill for about 2 hours.

TABLE VII

| Run | A | B |
|---|---|---|
| Grind Ingredients | | |
| Ex. 2 Alkyd, gms. | 85.02 | — |
| Ex. 5 Alkyd, gms. | — | 170.04 |
| Titanium dioxide, gms. | 63.8 | 127.52 |
| Ethoxyethyl acetate, gms. | 15.94 | 26.0 |
| Xylene, gms. | — | 26.0 |
| Let-Down Ingredients | | |
| Cymel 303, gms. | 19.6 | 39.2 |
| 40% solution of paratoluene sulfonic acid in isopropanol, gms. | 1.96 | 3.92 |
| Xylene, gms. | 15.94 | 33.5 |
| Ethoxyethyl acetate, gms. | — | 33.5 |

The formulations of Runs A and B were further modified by the addition of the additives shown in Table VIII and the coatings were sprayed onto steel panels and cured in a forced air oven at 250° C. for 20 minutes.

TABLE VIII

| Run | A1 | A2 | A3 | A4 | B1 | B2 | B3 | B4 | B5 | B6 | B7 |
|---|---|---|---|---|---|---|---|---|---|---|---|
| Coating Spray Formulations | | | | | | | | | | | |
| Run A Mixt., gms. | 50 | 50 | 50 | 50 | — | — | — | — | — | — | — |
| Run B Mixt., gms. | — | — | — | — | 50 | 50 | 50 | 50 | 50 | 50 | 50 |
| Silicone I, gms. | — | 0.5 | 1.0 | 0.5 | — | 0.5 | 0.5 | — | 0.5 | — | — |
| Multiflow, gm. | — | — | — | 0.5 | — | — | 0.5 | — | — | — | — |
| Modiflow, gm. | — | — | — | — | — | — | — | 0.5 | 0.5 | — | — |
| Troykyd 366, Anti-Crater, gm. | — | — | — | — | — | — | — | — | — | 0.5 | — |
| BYK-301, gm. | — | — | — | — | — | — | — | — | — | — | 0.5 |
| Coating Properties | | | | | | | | | | | |
| Acetone Rubs | 100 | 100 | 100 | 100 | 100 | 100 | 100 | 100 | 100 | 100 | 100 |
| Reverse Impact, in. lbs. | 150 | 150 | 150 | 150 | 225 | 200 | 175 | 250 | 200 | 175 | 150 |
| Face Impact, in. lbs. | 320 | 320 | 320 | 320 | 320 | 320 | 320 | 320 | 320 | 300 | 300 |
| Pencil Hardness | 2H | 2H | 2H | H | 2H | 2H | 2H | H | H | 2H | H |
| Crosshatch Adhesion, % | 100 | 100 | 100 | 100 | 100 | 100 | 100 | 100 | 100 | 100 | 100 |
| 20° Gloss, % | 60 | 65 | 67 | 74 | 80 | 75 | 78 | 70 | 70 | 67 | 80 |
| Wet Adhesion, % | 0 | 10 | 98 | 99 | 95 | 75 | 99 | 100 | 80 | 50 | 45 |
| Wet Pencil Hardness* | F | HB | 2H | F | H | 2H | H | B | F | HB | HB |

*After immersion in 55° C. water for 16 hours.
Multiflow ® is a non-silicone flow aid that improves flow and reduces pinholes and craters in solvent based coatings; sold by Monsanto Company of St. Louis, Mo.
Modaflow ® is a 100% solids, amber-liquid, acrylic resin modifier and flow aid with a specific gravity (25° C./25° C.) of 0.997; sold by Monsanto Co. of St. Louis, Mo.
BYK-301 ® is a 50% solution of a special, paint-compatible silicone resin in 2-butoxyethanol that is added to coating formulations to increase mar resistance and add slip to the final liquid. It has a pH of 7.5, a specific gravity of 0.961-0.964, and a refractive index of 1.435; sold by Byk-Mallinckrodt of Wesel, West Germany.
Troykyd 366 Anti-Crater ® is a pale yellow, 60% solids solution of a dispersing aid that is added to solvent-based coating formulations to aid substrate wetting. It has a specific gravity (25° C./25° C.)y 0.96 and is sold by Troy Chemical of Newark, New Jersey.

EXAMPLE 20

A series of coating compositions was prepared containing the components identified in Table IX, coated on steel panels with a No. 40 wire-wound rod and cured in a forced air oven. The properties of the cured coatings are also set forth in the table.

TABLE IX

| Ingredients | A | B | C | D | E | F | G | H | I | J | K | L | M | N | O | P |
|---|---|---|---|---|---|---|---|---|---|---|---|---|---|---|---|---|
| Ex. 7 Alkyd, gm. | 5 | 5 | 5 | 5 | 5 | 5 | — | — | — | — | — | — | — | — | — | — |
| Ex. 8 Alkyd, gm. | — | — | — | — | — | — | 5 | 5 | 5 | — | — | — | — | — | — | — |
| Ex. 9 Alkyd, gm. | — | — | — | — | — | — | — | — | — | 5 | 5 | 5 | — | — | — | — |
| Ex. 10 Alkyd, gm. | — | — | — | — | — | — | — | — | — | — | — | — | — | — | — | 5 |
| Ex. 12 Alkyd, gm. | — | — | — | — | — | — | — | — | — | — | — | — | 5 | 5 | 5 | — |
| Ex. 13 Alkyd, gm. | — | — | — | — | — | — | — | — | — | — | — | — | — | — | — | — |
| Cymel 303, gm. | 3.75 | 5 | 6.25 | 5 | 3.75 | 6.25 | 3.75 | 5 | 6. | 3.75 | 5 | 6.25 | 3.75 | 5 | 6.25 | 5 |
| 40% Sol. of para-toluene sulfonic acid in isopropanol, gm. | 0.2 | 0.2 | 0.2 | 0.1 | 0.1 | 0.1 | 0.1 | 0.1 | 0.1 | 0.1 | 0.1 | 0.1 | 0.1 | 0.1 | 0.1 | 0.1 |
| Silicone I, gm. | 0.1 | 0.1 | 0.1 | 0.1 | 0.1 | 0.1 | 0.05 | 0.05 | 0.05 | 0.05 | 0.05 | 0.05 | 0.05 | 0.05 | 0.05 | 0.05 |
| Ethoxyethyl acetate | 3 | 3 | 3 | 3 | 3 | 3 | 3 | 3 | 3 | 2 | 2 | 2 | 3 | 3 | 3 | 3 |
| Cured 20 min. at 220° C. | | | | | | | | | | | | | | | | |
| Acetone Rubs | 100 | 100 | 100 | 100 | 100 | 100 | — | — | — | 100 | 100 | 100 | 100 | 100 | 100 | 100 |
| Reverse Impact, in. lbs. | 75 | 125 | 75 | 320 | 300 | 250 | — | — | — | 150 | 100 | 150 | 50 | 75 | 75 | 320 |
| Face Impact, in lbs. | 275 | 275 | 175 | 320 | 320 | 320 | — | — | — | 275 | 320 | 275 | 175 | 175 | 250 | 320 |
| Pencil Hardness | 3H | 3H | 3H | 3H | 3H | 2H | — | — | — | H | H | H | 4H | 3H | 3H | H |
| Crosshatch Adhesion, % | 100 | 100 | 100 | 100 | 100 | 100 | — | — | — | 100 | 100 | 100 | 100 | 100 | 100 | 100 |
| Cured 20 min. at 250° C. | | | | | | | | | | | | | | | | |
| Acetone Rubs | — | — | — | — | — | — | 100 | 100 | 100 | — | — | — | — | — | — | — |
| Reverse Impact, in. lbs. | — | — | — | — | — | — | 75 | 125 | 150 | — | — | — | — | — | — | — |
| Face Impact, in. lbs. | — | — | — | — | — | — | H | H | H | — | — | — | — | — | — | — |
| Crosshatch Adhesion, % | — | — | — | — | — | — | 100 | 100 | 100 | — | — | — | — | — | — | — |

EXAMPLE 21

Pigmented coatings were prepared from the alkyds described in Examples 10 and 13. A pigment grind was prepared containing the ingredients described in Table X by weighing them into a ball mill, adding the grinding pebbles, sealing the system, and allowing the system to grind overnight on a roll mill.

TABLE X

| Run<br>Grind Ingredients | A | B |
|---|---|---|
| Ex. 10 Alkyd, gms. | 100 | — |
| Ex. 13 Alkyd, gms. | — | 50 |
| Titanium dioxide, gms. | 200 | 100 |
| Silicone I, gm. | 1.0 | 1.0 |
| Butyl acetate, gms. | 100 | 70 |
| LPCA-2011, gms.* | — | 25 |
| Cymel 303, gms. | — | 25 |

The above system was then let-down by adding the ingredients described below in Table X-A and the system was again sealed and placed on the roll mill for two hours of additional blending.

TABLE X-A

| | Run | |
|---|---|---|
| Let-Down Ingredients | A | B |
| Cymel 303, gms. | 100 | 12.5 |
| Butyl acetate, gms. | 25 | 20 |
| 40% solution of paratoluene sulfonic acid in isopropanol, gm. | — | 1.0 |

These coating systems were then blended with the ingredients indicated below in Table X-B and sprayed onto steel panels with a conventional, suction-feed spray gun and then cured in a forced air oven and evaluated.

TABLE X-B

| Run | A-1 | A-2 | A-3 | B-1 | B-2 |
|---|---|---|---|---|---|
| Spray Ingredients | | | | | |
| Run A Product, gm. | 263 | 263 | 263 | — | — |
| 40% Solution of paratoluene sulfonic acid in isopropanol, gms. | 2.5 | 1.5 | 2.5 | — | — |
| Butyl acetate, gms. | 25 | 25 | 25 | — | — |
| Multiflow, gms. | — | — | 2.0 | — | — |
| Run B Product, gms. | — | — | — | 304.5 | 304.5 |
| Cure Conditions | | | | | |
| Temperature, °C. | 220 | 250 | 220 | 220 | 250 |
| Time, min. | 20 | 20 | 20 | 20 | 20 |
| Coating Properties | | | | | |
| Acetone Rubs | 100 | 100 | 100 | 100 | 100 |
| Reverse Impact, in. lbs. | 125 | 175 | 125 | 150 | 50 |
| Face Impact, in. lbs. | 250 | 320 | 300 | 175 | 150 |
| Pencil Hardness | H | H | 2B | H | 2H |
| 20° Gloss, % | 61 | 44 | 57 | 62 | 67 |
| Crosshatch Adhesion, % | — | — | — | 100 | 100 |

EXAMPLE 22

Coatings were prepared from the alkyds containing maleic anhydride or maleic acid that are described in Examples 14 to 16. The ingredients listed in Table XI were weighed into a container, blended, cast onto steel panels with a No. 40 wire-wound rod, and cured in a forced air oven.

TABLE XI

| Run | A | B | C | D | E | F | G | H | I |
|---|---|---|---|---|---|---|---|---|---|
| Ingredients | | | | | | | | | |
| Ex. 14 Alkyd. gms. | 5 | 5 | 5 | — | — | — | — | — | — |
| Ex. 15 Alkyd, gms. | — | — | — | 5 | 5 | 5 | — | — | — |
| Ex. 16 Alkyd, gms. | — | — | — | — | — | — | 5 | 5 | 5 |
| Cymel 303, gms. | 3.75 | 5 | 6 | 3.75 | 5 | 6 | 3.75 | 5 | 6 |
| 40% Soln. of paratoluene sulfonic acid in isopropanol, gm. | 0.1 | 0.1 | 0.1 | 0.1 | 0.1 | 0.1 | 0.1 | 0.1 | 0.1 |
| Silicone I, gm. | 0.1 | 0.1 | 0.1 | 0.1 | 0.1 | 0.1 | 0.1 | 0.1 | 0.1 |
| Ethoxyethyl acetate | 2 | 2 | 2 | 3 | 3 | 3 | 2 | 2 | 2 |
| Results, Cured 20 min. at 250° C. | | | | | | | | | |
| Acetone Rubs | 100 | 100 | 100 | 100 | 100 | 100 | — | — | — |
| Reverse Impact, in. lbs. | 100 | 50 | 50 | 100 | 125 | 175 | — | — | — |
| Face Impact, in. lbs. | 300 | 175 | 150 | 250 | 275 | 320 | — | — | — |
| Pencil Hardness | 3H | 4H | 4H | 3H | 4H | 4H | — | — | — |
| Crosshatch Adhesion, % | 100 | 100 | 100 | 100 | 100 | 100 | — | — | — |
| Results, Cured 20 min. at 100° C. | | | | | | | | | |
| Acetone Rubs | 100 | 100 | 100 | 100 | 100 | 90 | 100 | 100 | 100 |
| Reverse Impact, in. lbs. | 175 | 175 | 250 | 200 | 320 | 320 | 320 | 320 | 275 |
| Face Impact, in. lbs. | 320 | 175 | 320 | 320 | 320 | 320 | 320 | 320 | 320 |
| Pencil Hardness | 3H | 3H | 3H | 3H | H | H | 3H | 3H | 2H |
| Crosshatch Adhesion, % | 100 | 100 | 100 | 100 | 100 | 100 | 100 | 100 | 100 |

EXAMPLE 23

Pigmented coatings were prepared from the alkyds described in Examples 14, 15 and 16. A pigment grind was prepared from the ingredients shown in Table XII by weighing them into a ball mill, adding the grinding pebbles, sealing the system, and allowing the system to grind overnight on a roll mill.

TABLE XII

| Run | A | B | C |
|---|---|---|---|
| Grind Ingredients | | | |
| Ex. 14 Adduct, gms. | 100 | — | — |
| Ex. 15 Adduct, gms. | — | 100 | — |
| Ex. 16 Adduct, gms. | — | — | 100 |
| Cymel 303, gms. | 100 | 100 | 100 |
| Titanium dioxide, gms. | 150 | 150 | 150 |
| Ethoxyethyl acetate, gms. | 100 | 100 | 100 |

The grinds were filtered and let down to spray viscosity by blending in the following ingredients.

| Let-Down Ingredient | A' | B' | C' |
|---|---|---|---|
| Run A Product, gms. | 424 | — | — |
| Run B Product, gms. | — | 422 | — |
| Run C Product, gms. | — | — | 423 |
| Ethoxyethyl acetate, gms. | 30 | 60 | 40 |
| Room Temperature Viscosity, cps. | 125 | 125 | 123 |

To two hundred grams of each of the Run A', B', and C' mixtures, 0.44 gram of a 40% solution of paratoluene sulfonic acid in isopropanol (catalyst) and 0.44 gram of Silicone I were added and the system was well mixed. The coatings were sprayed onto steel panels with a conventional, suction-feed spray gun and cured in a forced air oven. In the series labeled A'-2, B'-2, and C'-2, the amount of catalyst was doubled.

| Run | A'-1 | A'-2 | B'-1 | B'-2 | C'-1 | C'-2 |
|---|---|---|---|---|---|---|
| Cured at 250° C., 20 min. | | | | | | |
| Acetone Rubs | 100 | 100 | 100 | 100 | 100 | 100 |
| Reverse Impact, in. lbs. | — | 100 | — | 200 | — | 175 |
| Face Impact, in. lbs. | — | 300 | — | 320 | — | 320 |
| Pencil Hardness | F | H | 2B | H | B | 2H |
| Crosshatch Adhesion, % | 100 | 100 | — | 100 | 100 | 100 |
| 20° Gloss, % | 73 | 81 | 72 | 80 | 80 | 83 |
| Cured at 275° C., 20 min. | | | | | | |
| Acetone Rubs | 100 | — | 100 | — | 100 | — |
| Reverse Impact, in. lbs. | 175 | — | 150 | — | 125 | — |
| Face Impact, in. lbs. | 320 | — | 320 | — | 320 | — |
| Pencil Hardness | H | — | H | — | H | — |
| Crosshatch Adhesion, % | 100 | — | 100 | — | 100 | — |

EXAMPLE 24

Following a procedure similar to that used for Examples 4–16, the reactor was charged with the following ingredients:

Esterdiol propoxylate A: 366.2 gms.
Maleic acid: 11.6 gms.
Isophthalic acid: 49.8 gms.
Dibutyl tin dilaurate: 0.16 gms.

After 11 hours reaction time, the hydroxyl number of the reaction mixture was constant at 17; at this point 0.16 gm. of dibutyl tin dilaurate was added to the reaction mixture and it was heated for an additional 7 hours. After this time the acid number again stabilized and another 0.16 gms. of dibutyl tin dilaurate was added to the reaction mixture. Heating was continued for an additional 15.5 hours. After this period, the acid number was 0.95; and the heating was terminated, the product cooled, filtered, and stored. The 100% solids, oil-free alkyd produced had a viscosity of 2,875 cps at room temperature.

The alkyd described above was combined with the ingredients listed in Table XIII by weighing them into a container, mixing well, and cast onto steel panels using a number 40 wire-wound rod. The coating was cured for 20 minutes in a 250° F. forced-air oven.

TABLE XIII

| | Run | | | | | |
|---|---|---|---|---|---|---|
| | A | B | C | D | E | F |
| Ingredients | | | | | | |
| Ex. 24 Alkyd, gms. | 5 | 5 | 5 | 5 | 5 | |
| Cymel 303, gms. | 3.75 | 5 | 6.25 | 1.88 | 2.5 | 5 |
| 40% Solution of paratoluene sulfonic acid in isopropanol, gm. | 0.1 | 0.1 | 0.1 | 0.1 | 0.1 | 0.1 |
| Silicone I, gm. | 0.1 | 0.1 | 0.1 | 0.1 | 0.1 | 0.1 |
| Ethoxyethyl acetate, gms. | 2 | 2 | 2 | 2 | 2 | 2 |
| 4,4'-Dicyclohexylmethane diisocyanate, gm. | 0 | 0 | 0 | 0 | 0 | 1.0 |
| Properties | | | | | | |
| Acetone Rubs | 100 | 100 | 100 | 60 | 100 | 100 |
| Reverse Impact, in. lbs. | 75 | 75 | 75 | 100 | 50 | >320 |
| Face Impact, in. lbs. | 175 | 175 | 275 | 200 | 225 | >320 |
| Pencil Hardness | 2H | 3H | 2H | 2H | 2H | 2B |
| Crosshatch Adhesion, % | 100% | 100% | 100% | 100% | 100% | 100% |

EXAMPLE 25

The alkyd of Example 13 was combined with the ingredients listed in Table XIV by weighing them into a container, mixing well, and cast onto steel panels using a No. 40 wire-wound rod. The coatings were cured for 20 minutes at 220° F. in a forced-air oven. The properties of the cured coatings were determined after the cooled panels were stored at room temperature for 7 days.

TABLE XIV

| | Run | | | | | | |
|---|---|---|---|---|---|---|---|
| | A | B | C | D | E | F | G |
| Ingredients | | | | | | | |
| Ex. 13 Product gms. | 5 | 5 | 5 | 5 | 5 | 5 | 5 |
| Cymel 303, gms. | 3.75 | 5 | 6.25 | 3.75 | 5 | 6.25 | 2.5 |
| Silicone I, gm. | 0.05 | 0.05 | 0.05 | 0.05 | 0.05 | 0.05 | 0.05 |
| 40% Solution of paratoluene | | | | | | | |

TABLE XIV-continued

| | Run | | | | | | |
|---|---|---|---|---|---|---|---|
| | A | B | C | D | E | F | G |
| sulfonic acid in isopropanol, gm. | 0.1 | 0.1 | 0.1 | 0.05 | 0.05 | 0.05 | 0.05 |
| Ethoxyethyl acetate, gms. | 3 | 3 | 3 | 2 | 2 | 2 | 2 |
| LPCA-2011, gms. | 0 | 0 | 0 | 0 | 0 | 0 | 2.5 |
| Properties | | | | | | | |
| Acetone Rubs | 100 | 100 | 100 | 100 | 100 | 100 | 100 |
| Reverse Impact, in. lbs. | 150 | 250 | 225 | 150 | 150 | 150 | 150 |
| Face Impact in. lbs. | 300 | >320 | >320 | 300 | 300 | 300 | 300 |
| Pencil Hardness | 3H | 3H | 3H | F | F | F | H |
| Crosshatch Adhesion, % | 100 | 100 | 100 | 100 | 100 | 100 | 100 |

EXAMPLE 26

The alkyd of Example 7 was combined with the ingredients indicated in Table XV to prepare pigmented coating formulations. The ingredients were weighed into a ball mill, grind pebbles added, and the system was sealed and ground overnight. To 10 parts of each system, 0.02 part of a 40% solution of para-toluene sulfonic acid in isopropanol was added and the mixture was well blended. The coatings were cast onto steel panels with a No. 40 wire-wound rod and cured in a forced-air oven at the indicated times and temperatures. (Molywhite® 212 is a white, basic calcium zinc molybdate composition that contains less than 0.03% lead and is used as a corrosion inhibiting pigment).

TABLE XV

| | Run | | |
|---|---|---|---|
| | A | | B |
| Ingredients | | | |
| Ex. 7 Product, gms. | 50 | | 50 |
| Cymel 303, gms. | 50 | | 50 |
| Iron Oxide, gms. | 50 | | 50 |
| Barium Sulfate, gms. | 177.5 | | 0 |
| Aluminum Silicate, gms. | 25 | | 25 |
| Molywhite 212, gms. | 0 | | 177.5 |
| Ethoxyethyl Acetate, gms. | 100 | | 100 |
| Cure Conditions | | | |
| Time, mins. | 20 | 20 | 20 |
| Temperature, °F. | 200 | 220 | 250 |
| Properties | | | |
| Acetone Rubs | 100 | 100 | 100 |
| Reverse Impact, in. lbs. | 50 | 25 | 300 |
| Face Impact, in. lbs. | 100 | 75-100 | >320 |
| Pencil Hardness | H | 2H | 2H |
| Crosshatch Adhesion, % | 100 | 100 | 100 |
| Cleveland Humidity Chamber Results* | | | |
| (ASTM D-2247), 140° F. | | | |
| Time, hrs. | — | 192 | 216 |
| Rust (ASTM D-610) | — | 6 | 9 |
| Blister (ASTM D-714) | — | 1 | 10 |
| Scribe Failure (D-1654) | — | 10 | 10 |
| gloss (D-523) | — | 10 | 10 |

*10 indicates no failure; 0 indicates complete failure

What is claimed is:

1. An alkyd resin comprising the reaction product of (A) an ester diol alkoxylate of the formula

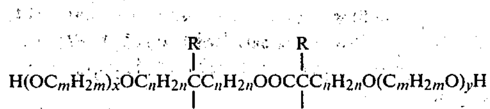

wherein m is an integer having a value of from 2 to 4, n is an integer having a value of from 1 to 5, x and y are integers each having a value of from 1 to 20, and R is an unsubstituted or substituted alkyl group having from 1 to 8 carbon atoms with (B) a polyol and (C) a polycarboxylic acid or anhydride thereof.

2. An alkyd resin as claimed in claim 1, wherein m has a value of 2 to 3, n has a value of from 1 to 3, x and y each have values of from 1 to 10, and R is an alkyl group having from 1 to 3 carbon atoms.

3. An alkyd resin as claimed in claim 1, wherein said ester diol alkoxylate is an ester diol ethoxylate.

4. An alkyd resin as claimed in claim 1, wherein said ester diol alkoxylate is an ester diol propoxylate.

5. An alkyd resin as claimed in claim 1, wherein said ester diol alkoxylate is an ester diol co-(ethoxylate-propoxylate).

6. An alkyd resin as claimed in claim 1, wherein said polyol contains from 2 to 6 hydroxyl groups.

7. An alkyd resin as claimed in claim 1, wherein said polycarboxylic acid or anhydride thereof contains from 2 to 3 carboxyl equivalents.

8. An alkyd resin as claimed in claim 1, comprising the reaction product of an ester diol ethoxylate, trimethylolpropane and isophthalic acid.

9. An alkyd resin as claimed in claim 1, comprising the reaction product of an ester diol propoxylate, trimethylolpropane and isophthalic acid.

10. An alkyd resin as claimed in claim 1, wherein said polyol is trimethylolpropane and said polycarboxylic acid is at least one member of the group phthalic anhydride, tetrahydrophthalic anhydride, succinic anhydride, adipic acid, dodecenylsuccinic anhydride, sebacic acid, d,l-malic acid, nadic anhydride, maleic acid or maleic anhydride.

11. A coating composition comprising from 20 to 90 weight percent of the alkyd resin claimed in claim 1, up to 60 weight percent organic solvent, from 10 to 70 weight percent crosslinker and from 0 to 10 weight percent cure catalyst.

12. A coating composition as claimed in claim 11, wherein in said alkyd resin m has a value of 2 to 3, n has a value of from 1 to 3, x and y each have values of from 1 to 10, and R is an alkyl group having from 1 to 3 carbon atoms.

13. A coating composition as claimed in claim 11, wherein in said alkyd resin said ester diol alkoxylate is an ester diol ethoxylate.

14. A coating composition as claimed in claim 11, wherein in said alkyd resin said ester diol alkoxylate is an ester diol propoxylate.

15. A coating composition as claimed in claim 11, wherein in said alkyd resin said ester diol alkoxylate is an ester diol co-(ethoxylate-propoxylate).

16. A coating composition as claimed in claim 11, wherein in said alkyd resin said polyol contains from 2 to 6 hydroxyl groups.

17. A coating composition as claimed in claim 11, wherein in said alkyl resin said polycarboxylic acid or anhydride thereof contains from 2 to 3 carboxyl equivalents.

18. A coating composition as claimed in claim 11, wherein in said alkyd resin comprises the reaction product of an ester diol ethoxylate, trimethylolpropane and isophthalic acid.

19. A coating composition as claimed in claim 11, wherein in said alkyd resin comprises the reaction product of an ester diol propoxylate, trimethylolpropane and isophthalic acid.

20. A coating composition as claimed in claim 11, wherein in said alkyd resin said polyol is trimethylolpropane and said polycarboxylic acid is at least one member of the group phthalic anhydride, tetrahydrophthalic anhydride, succinic anhydride, adipic acid, dodecenylsuccinic anhydride, sebacic acid, d,l-malic acid, nadic anhydride, maleic acid or maleic anhydride.

21. A coating composition as claimed in claim 11, wherein said crosslinker is hexamethoxymethyl melamine.

* * * * *

UNITED STATES PATENT AND TRADEMARK OFFICE

CERTIFICATE OF CORRECTION

PATENT NO. : 4,297,476

DATED : October 27, 1981

INVENTOR(S) : Joseph V. Koleske

It is certified that error appears in the above—identified patent and that said Letters Patent is hereby corrected as shown below:

Column 8, line 56, insert -- Silicone I is: --

Column 10, Table VI in the line designated Run, the last letter "E" should read -- F --

Columns 11 and 12, Table IX, the designation "Pencil Hardness" was omitted near the bottom of Table IX, the first column designations and values for columns G, H and I should read as follows:

| | | | |
|---|---|---|---|
| Face Impact in lbs. ------------- | 150 | 250 | 320 |
| Pencil Hardness ----------------- | H | H | H |
| Crosshatch Adhesion, % ---------- | 100 | 100 | 100 |

Column 14, Table XI, first column, 8th line from the bottom, "100°C." should read -- 200°C. --

Column 16, Table XIII, Run F should contain an indication in line 1 of the presence of 5 grams of Ex. 24 Alkyd.

Signed and Sealed this

*Eighth* Day of *February 1983*

[SEAL]

*Attest:*

GERALD J. MOSSINGHOFF

*Attesting Officer* *Commissioner of Patents and Trademarks*